(12) United States Patent
Donabedian et al.

(10) Patent No.: US 10,882,563 B2
(45) Date of Patent: Jan. 5, 2021

(54) ROOF PANEL ANTI-FLUTTER REINFORCEMENT

(71) Applicant: FORD GLOBAL TECHNOLOGIES, LLC, Dearborn, MI (US)

(72) Inventors: Edgar Edward Donabedian, Livonia, MI (US); Darrin Neil Wagner, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/709,521

(22) Filed: Dec. 10, 2019

(65) Prior Publication Data

US 2020/0140019 A1  May 7, 2020

Related U.S. Application Data

(62) Division of application No. 15/686,611, filed on Aug. 25, 2017, now Pat. No. 10,526,021.

(51) Int. Cl.
  *B62D 25/06* (2006.01)
  *B62D 27/02* (2006.01)

(52) U.S. Cl.
  CPC .......... *B62D 25/06* (2013.01); *B62D 27/026* (2013.01)

(58) Field of Classification Search
  CPC .............................. B62D 25/06; B62D 27/026
  USPC ............................................. 296/210, 29, 30
  See application file for complete search history.

(56) References Cited

U.S. PATENT DOCUMENTS

| | | | |
|---|---|---|---|
| 9,045,168 B2 | 6/2015 | Wagner et al. |
| 9,150,255 B2 | 10/2015 | Marchesano et al. |
| 9,630,654 B2 | 4/2017 | Conze |
| 2007/0176467 A1 | 8/2007 | Watanabe et al. |
| 2014/0028057 A1 | 1/2014 | Nishimura et al. |
| 2015/0336621 A1 | 11/2015 | Godon et al. |

*Primary Examiner* — Joseph D. Pape
(74) *Attorney, Agent, or Firm* — David Coppiellie; Brooks Kushman P.C.

(57) ABSTRACT

An anti-flutter structure, or reinforcement panel, for a roof panel supported on transversely extending roof bows. The reinforcement panel is attached to at least one of the roof bows with the flanges being disposed above the roof bow. The flanges extend longitudinally, and are resiliently compressed by the roof panel. The reinforcement panel has a body and flanges laterally flanking the body. The body is attached to one of the roof bows with the flanges being disposed above the roof bow. The anti-flutter material is disposed between the flanges and the roof panel.

5 Claims, 3 Drawing Sheets

ROOF PANEL ANTI-FLUTTER REINFORCEMENT

REFERENCE TO RELATED APPLICATIONS

This application is a division of U.S. application Ser. No. 15/686,611 filed Aug. 25, 2017, now U.S. Pat. No. 10,526,021 issued Jan. 7, 2020, the disclosure of which is hereby incorporated in its entirety by reference herein.

TECHNICAL FIELD

This disclosure relates to roof panels supported on roof bows that are secured together with an anti-flutter reinforcement that minimizes noise and vibration.

BACKGROUND

In an effort to reduce overall vehicle weight, aluminum is proposed to be used for both structural and exterior body panels. Aluminum roof panels on large SUV vehicles are susceptible to thermal deflections during the electro-coat and paint bake processes. Thinner gauge material is preferred to be used on roof panels which increases the rate and magnitude of thermal deflection compared to supporting roof bows that are formed of thicker gauge material. The difference in thermal deflection between the roof panel and supporting roof bows causes an increase in the gap between these parts.

Anti-flutter material provided as a tape or mastic paste is applied to bows that support the roof panel during assembly prior to electro-coating and the paint bake operations. The anti-flutter material supports the roof panel after curing where the roof panel is joined to the roof bows. Anti-flutter material has a low modulus of elasticity and does not add strength or stiffness to the joint between the roof panel and the roof bows but instead expands to a limited extent to compensate for the gap caused by differential between the thermal deflection of the roof panel and the roof bows. Generally, the gap between the roof panel and roof bows in the finished vehicle should be less than 6 millimeters to assure proper adhesion that, in turn, minimizes flutter of the roof panel when the vehicle is driven.

This disclosure is directed to solving the above problems and other problems as summarized below.

SUMMARY

This disclosure is directed to a roof panel reinforcement that compensates for thermal deflection between roof panel and roof bows and that is used as a carrier for an anti-flutter tape or other adhesive material. The roof panel reinforcement is comprised of a material of appropriate grade and gauge that has a series of holes or slots defined by the reinforcement to enable the reinforcement to deflect upon contact during the roof panel framing process. A nominal gap of approximately 3 millimeters is established during the roof framing process that expands during the electro-coating and paint bake process. The flanges on the reinforcement spring back as thermal deflection occurs, to facilitate conforming the reinforcement to the roof panel. By the action of the reinforcement springing back to conform to the roof panel during thermal deflection, it is possible to use an anti-flutter material having limited expansion characteristics.

According to one aspect of this disclosure, a roof assembly is disclosed that comprises a roof panel, roof bows, a reinforcement panel, and an anti-flutter material. The roof bows extend transversely across and below the roof panel to support the roof panel. The reinforcement panel has a body portion and flanges laterally flanking the body portion. The body is attached to one of the roof bows with the flanges being disposed above the roof bow. The roof bows extend in the longitudinal direction and are resiliently compressed by the roof panel. The anti-flutter material is disposed between the flanges and the roof panel.

According to another aspect of this disclosure, an anti-flutter structure is disclosed for a roof panel supported on transversely extending roof bows. The anti-flutter panel has a body and flanges laterally flanking the body. The body is attached to at least one of the roof bows with the flanges being disposed above the roof bow. The flanges extend longitudinally and are resiliently compressed by the roof panel. The anti-flutter material is disposed between the flanges and the roof panel.

According to other aspects of the above this disclosure, the reinforcement panel may include upstanding walls between the flanges and the body. The upstanding walls may be joined to the flanges at an upper corner, and the upper corner may define a plurality of openings that increase the flexibility of the corner. The upstanding walls may be joined to the body at a lower corner, and the lower corner may define a plurality of openings that increase the flexibility of the lower corner.

The roof bow may have outwardly extending flanges, and the reinforcement panel may be attached to the outwardly extending flanges.

The flanges may exert a biasing force on the roof panel. The roof panel may exhibit greater thermal expansion than the roof bows making the roof panel move away from the roof bows when heated so that the flanges flex upwardly toward the roof panel.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
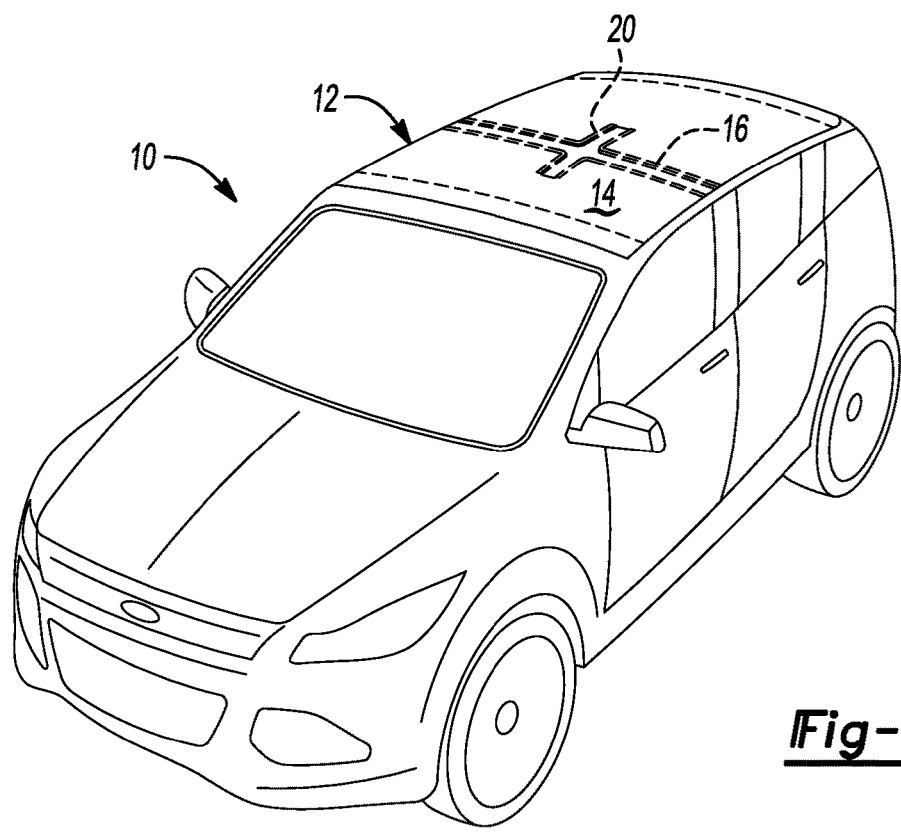
FIG. 1 is a left/front perspective view of a vehicle showing a roof bow with a reinforcement panel made according to one aspect of this disclosure.

Referring to FIG. 1, a vehicle 10 is illustrated that includes a roof assembly generally indicated by reference numeral 12. The roof assembly 12 includes a roof panel 14. An intermediate roof bow 16 is shown supporting the roof panel 14. As is well-known in the art, additional roof bows and a windshield header are also used to support the roof panel 14. A reinforcement panel 20 is assembled between the intermediate roof bow 16 and the roof panel 14. The reinforcement panel 20 could be assembled between the roof panel 14 and another roof bow or to more than one roof bows as required to reduce flutter of the roof panel 14.

Figure 2:
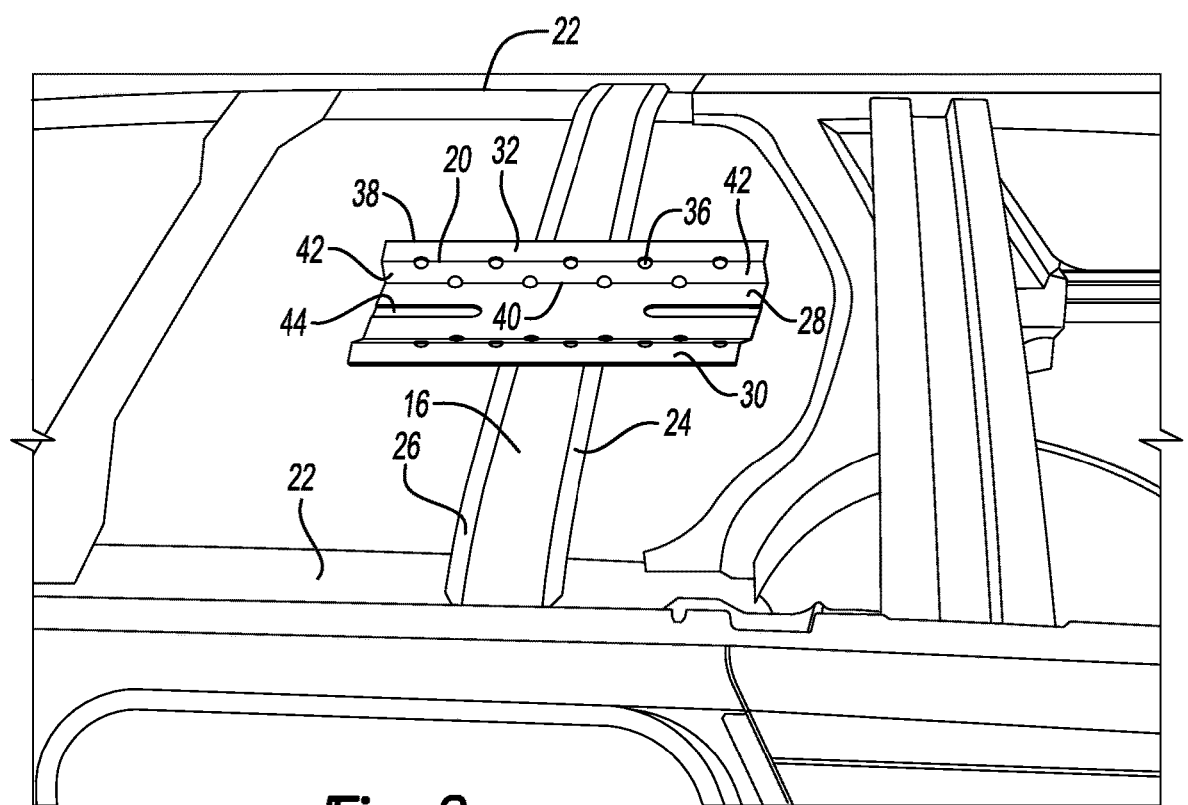
FIG. 2 is a fragmentary perspective view of a vehicle showing a reinforcement panel attached to the center of one of the roof bows.

Referring to FIG. 2, a portion of a roof assembly 12 is illustrated that includes a pair of roof rails 22. A front flange 26 and a back flange 24 are provided on the roof bow 16 that strengthen the roof bow.

Figure 3:
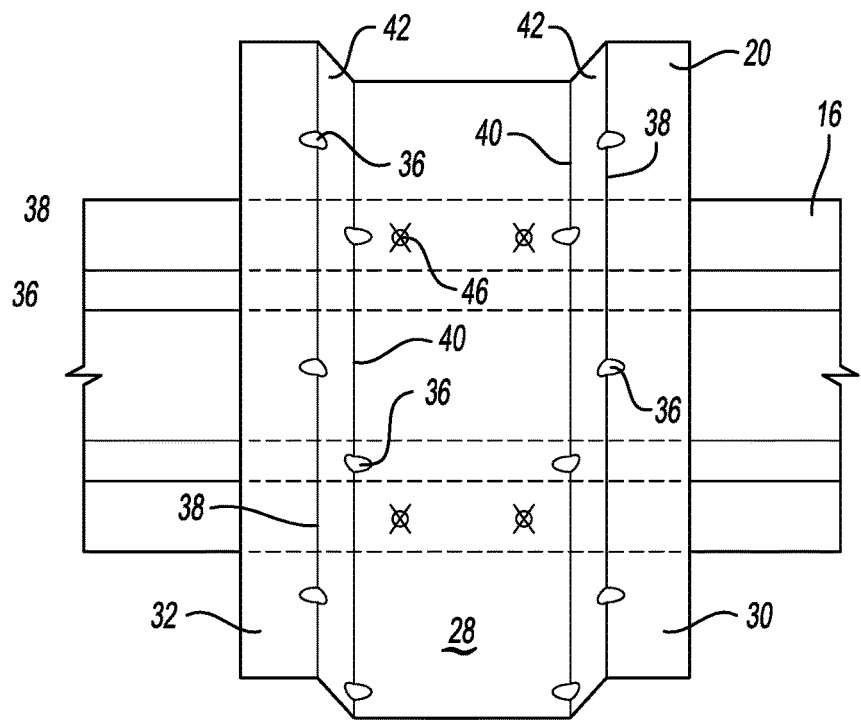
FIG. 3 is a fragmentary top plan view of part of a roof bow attached to the reinforcement shown in FIG. 1.

Referring to FIGS. 2 and 3, the reinforcement panel 20 is attached to the top of the roof bow 16 on the front flange 26 and the back flange 24. The reinforcement 16 has a body portion 28, or body, and a right flange 30 and left flange 32. A plurality of openings 36 are defined at either or both of an upper corner 38 or lower corner 40 formed on the reinforcement panel 20. The openings 36 may be either circular holes, holes of other shapes, or slots. The upper corner 38 is located at the juncture of one of the flanges 30, 32 and an upstanding wall 42. The lower corner 40 is located at the juncture of the body 28 and the upstanding walls 42. A reinforcing rib 44 may be provided in the body to add strength and rigidity to the body 28. The reinforcement panel 20 is fixedly attached by fasteners or welds to the front flange 26 and the back flange 24 of the roof bow 16.

Figure 4:
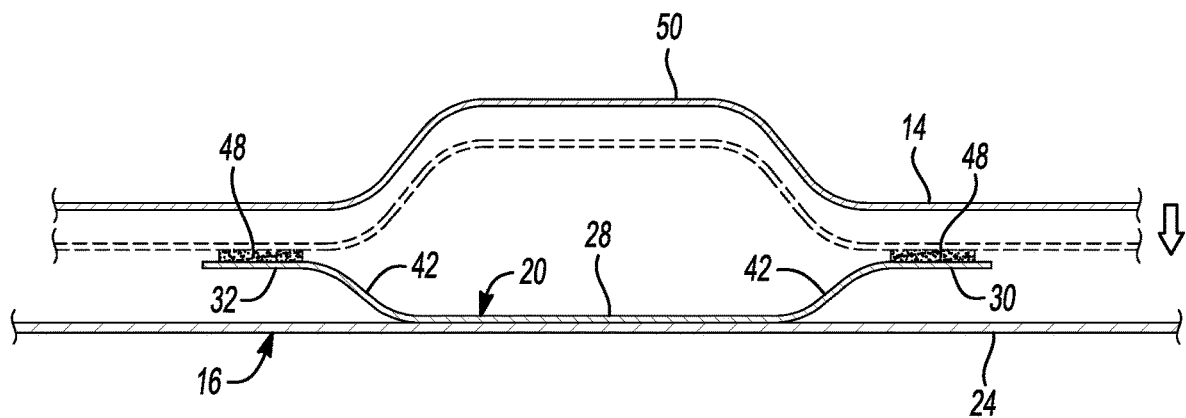
FIG. 4 is a fragmentary cross-section view of a roof panel, a roof bow flange and a reinforcement panel.

Referring to FIG. 4, the roof panel 14 is shown above the reinforcement panel 20 and the roof bow 16 with an arrow showing the direction that the roof panel is moved to be assembled over the reinforcement panel 20 and the roof bow 16. The dashed lines in FIG. 4 illustrate the position of the roof panel 14 as it contacts the anti-flutter tape 48. Anti-flutter tape is placed on the right flange 30 and left flange 32 prior to assembling the roof panel 14. The anti-flutter tape 48 adheres to the lower surface of the roof panel 14 and the right flange 30 and left flange 32 during vehicle assembly, electro-coating and paint bake ovens. The anti-flutter tape remains adhered to the roof panel 14 and right and left flanges 30, 32 when the vehicle is placed into service to prevent unwanted flutter noise and vibration.

Figure 5:
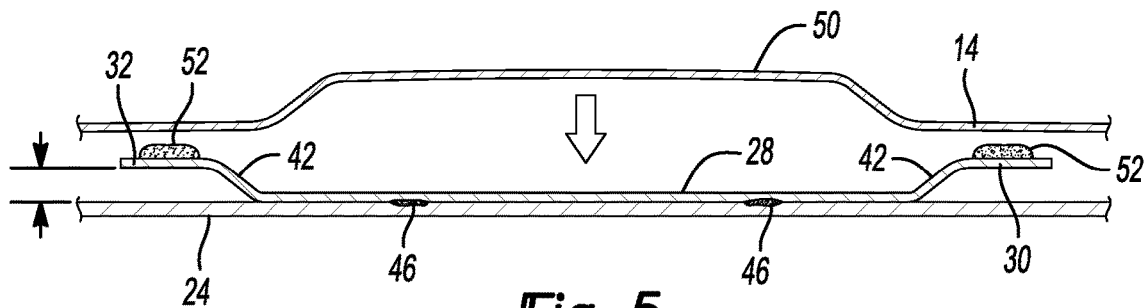
FIG. 5 is a fragmentary cross-section view of a roof panel, a roof bow flange and a reinforcement panel showing the roof panel being assembled to the reinforcement panel and the roof bow flange.
Figure 6:
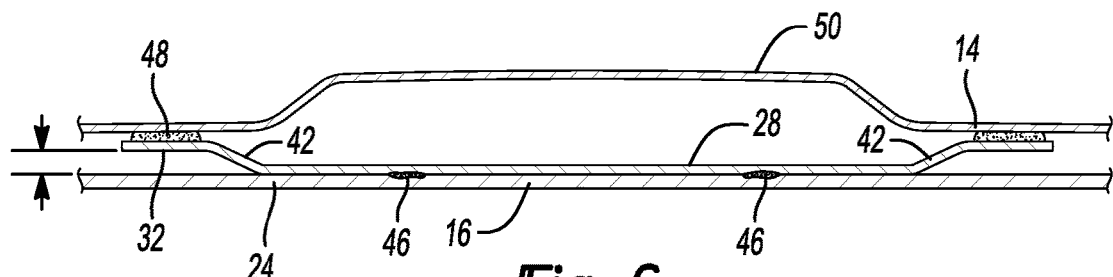
FIG. 6 is a fragmentary cross-section view of a roof panel, a roof bow flange and a reinforcement panel showing the roof panel assembled to the reinforcement panel and the roof bow flange.

Referring to FIGS. 5 and 6, compression of the flanges 30, 32 by the roof panel 14 during assembly is illustrated. A raised bead 50 of the roof panel 14 may be aligned with the reinforcement panel 20 to prevent or minimize distortion of the roof panel in the area where the reinforcement panel 20 is attached to the lower surface of the roof panel 14. Instead of anti-flutter tape, an anti-flutter mastic paste 52 may be applied to the right flange 30 and left flange 32 prior to assembling the roof panel 14.

The spacing between the arrows on the left side of FIGS. 5 and 6 show that the flanges 30, 32 are compressed by the weight of the roof panel 14. For example, the initial spacing shown in the unassembled state in FIG. 5 may be 6 millimeters. In the after assembled state shown in FIG. 6, the spacing may be reduced to about 3 millimeters. The upstanding walls 42 extending above the body 28 of the reinforcing panel 20 allow the flanges 30, 32 to flex toward the flange 24 of the roof bow 16 while exerting a biasing force on the roof panel 14.

During subsequent processing of the vehicle, the roof panel is heated in the electro-coating baths and in the paint ovens. The greater thermal deflection of the larger and thinner roof panel 14 relative to the smaller and thicker roof bow 16 causes the roof panel 14 to separate from the roof bow 16. When this occurs, the reinforcement panel 20 reacts with the flanges 30, 32 springing back up toward their preassembled orientation.

Figure 7:
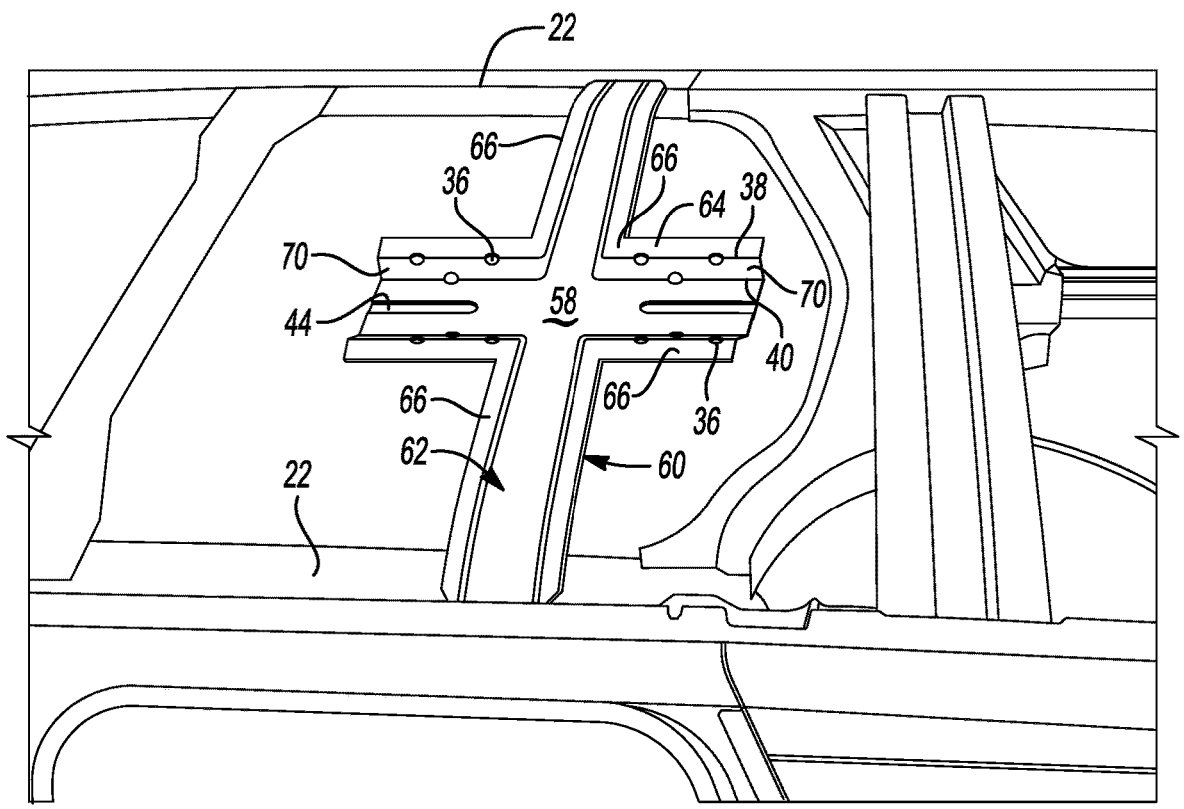
FIG. 7 is a fragmentary perspective view of a vehicle showing an alternative embodiment of this disclosure in which an integral combined roof bow and reinforcement panel reinforcement panel is attached to the center of one of the roof bows.

Referring to FIG. 7, a combined roof bow and anti-flutter reinforcement 60 is illustrated in a view similar to that of FIG. 2. Elements of the roof structure and reinforcement panel that are like those shown and described with reference to FIGS. 1-6 are assigned the same reference numerals for brevity. The combined roof bow and anti-flutter reinforcement 60 is attached to spaced roof rails 22 and includes a roof bow portion 62 and an anti-flutter reinforcement 64. L-shaped flanges 66 are provided on the combined roof bow and anti-flutter reinforcement 60 that are spaced above a body 68 by upstanding walls 70.

As previously described openings 36 are provided at an upper corner 38 formed at the juncture of the L-shaped flanges 66 and the upstanding walls 70. Lower corners 40 are provided at the juncture of the body 68 and the upstanding walls 70. The openings are provided to increase the flexibility of the combined roof bow and anti-flutter reinforcement 60. A reinforcing rib 44 may be provided as needed to increase the strength of the anti-flutter reinforcement 64.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A roof assembly comprising:
    a roof panel;
    a roof bow extends laterally across and below the roof panel for supporting the roof panel, wherein an anti-flutter reinforcement portion extends fore-and-aft of a bow portion between lateral ends of the bow portion, wherein the anti-flutter reinforcement portion has a body and two flanges laterally flanking the body, wherein the flanges are disposed above the bow portion, and are resiliently compressed by the roof panel; and
    an anti-flutter material is provided between the flanges and the roof panel.

2. The roof assembly of claim 1 wherein the anti-flutter reinforcement portion includes an upstanding wall between the flanges and the body.

3. The roof assembly of claim 1 further comprising a plurality of upstanding walls joined to the flanges at an upper corner, and wherein the upper corner defines a plurality of openings that increase flexibility of the upper corner.

4. The roof assembly of claim 1 wherein a plurality of upstanding walls are joined to the body at a lower corner, and wherein the lower corner defines a plurality of openings that increase flexibility of the lower corner.

5. The roof assembly of claim 1 wherein the flanges exert a biasing force on the roof panel, wherein the roof panel exhibits greater thermal expansion than the roof bows, and wherein the roof panel moves away from the roof bows when heated and the flanges flex upwardly toward the roof panel.

* * * * *